United States Patent [19]

Bes et al.

[11] Patent Number: 4,988,477

[45] Date of Patent: Jan. 29, 1991

[54] AN INJECTION-BLOW MOLDING METHOD FOR MANUFACTURING A COLORED POLYESTER CONTAINER

[75] Inventors: Richard F. T. Bes; Jan D. Knol, both of Apeldoorn, Netherlands

[73] Assignee: Holland Colours Apeldoorn B. V., Netherlands

[21] Appl. No.: 250,350

[22] Filed: Sep. 28, 1988

[30] Foreign Application Priority Data

Sep. 28, 1987 [NL] Netherlands ................... 8702312

[51] Int. Cl.$^5$ ............................................. B29C 49/06
[52] U.S. Cl. ........................... 264/537; 264/328.17; 264/328.18
[58] Field of Search ............... 264/328.18, 537, 122, 264/123, 126, 328.17

[56] References Cited

U.S. PATENT DOCUMENTS

| 3,291,883 | 12/1966 | Cornelius et al. | 264/328.18 |
| 3,972,665 | 8/1976 | Andrews, III | 264/328.18 |
| 3,978,036 | 8/1976 | Pollard | 264/140 |
| 4,271,211 | 6/1981 | Knepper | 264/117 |
| 4,495,128 | 1/1985 | Stoffelsma | 264/211 |

FOREIGN PATENT DOCUMENTS

| 3519266 | 12/1986 | Fed. Rep. of Germany | 264/328.17 |
| 51-011854 | 1/1976 | Japan | 264/328.17 |
| 58-125743 | 7/1983 | Japan | 264/328.18 |
| 62-039209 | 2/1987 | Japan | 264/328.17 |

OTHER PUBLICATIONS

"Predrying Molding Powers", by W. E. Rahm, M. L. Macht and G. M. Kuettel.

*Primary Examiner*—Jan H. Silbaugh
*Assistant Examiner*—Catherine Timm
*Attorney, Agent, or Firm*—Ostrolenk, Faber, Gerb & Soffen

[57] ABSTRACT

A colored container of polyester obtained by injection molding of a preform starting from colorless polyester granulate to which a particulate dyestuff composition is fed. The particulate dyestuff composition used is a particulate intimate mixture of a dyestuff and/or a pigment and a solid wax-like carrier having a melting point above 45° C. The preform obtained is converted to the final shape by blow molding.

1 Claim, No Drawings

AN INJECTION-BLOW MOLDING METHOD FOR MANUFACTURING A COLORED POLYESTER CONTAINER

BACKGROUND OF THE INVENTION

The present invention relates in the first place to a coloured polyester container obtained in a two-stage method in which, in a first stage, starting from polyester granular material, injection moulding is used to produce a coloured preform which is converted to the desired final shape in a second stage.

The production of coloured containers from polyester is known. In this connection, a holder is understood to mean any product which is capable of containing a quantity of liquid, semisolid or solid product and may be formed by a bottle, a beaker, a tank, a dish, etc.

In producing a coloured container from polyester, for example, a coloured bottle from polyester, a two-stage method is employed in which, in the first place, a coloured preform is produced which is converted to the desired final shape in a second stage by blowing. This manner of working provides the possibility of allowing the manufacture of the preform and the conversion to the final shape in the second stage to take place at different places. The preform is, for example, produced centrally in a plastic material processing industry; the standard preforms are then transported to the various customers who have installations for converting the polyester work piece by means of an enveloping mould into the final shape. Such a manner of working entails appreciable savings in the transport costs and is therefore frequently used. To produce a coloured container from polyester, the possibility is known of starting from colourless polyester granular material which, prior to being introduced into the injection moulding machine, is mixed with a product which contains a dyestuff and/or pigment and which is added in a quantity such that the desired colour concentration in the polyester is reached. The coloured product may, for example, consist of a homogeneous coloured polyester granular material which contains, for example, 10% dyestuff and/or pigment or a paste consisting of dyestuff and/or pigment and a viscous liquid, for example, glycerol.

A coloured polyester container which is obtained in the known manner described above has, however, the disadvantage that, starting from coloured polyester granular material as an additive, there is a restriction on the colour density range, while it is difficult to achieve a good colour homogeneity at high colour density. If a coloured paste is used, there is the disadvantage that, as a result of the incorporation of a liquid carrier in the polyester, a deterioration of mechanical properties of the polyester is observed, as a result of which the possible applications decline in number; moreover, the possibility exists that the liquid carrier used is leached out of the holder during use, which is undesirable for, for example, use with foodstuffs.

The object of the present invention is to provide a coloured polyester container which has a homogeneous colouring, which can be produced in a colour density between wide limits, the mechanical properties of which do not differ, or virtually do not differ, from those of a colourless container and in which the ability of any agents used to be leached out is minimumal.

SUMMARY OF THE INVENTION

The coloured holder of the type specified above is characterized according to the invention in that the coloured preform is produced by injection moulding from colourless polyester granular material, with particles of a dyestuff composition consisting of an intimate mixture of a dyestuff and/or pigment and a solid wax-like carrier being fed in. Surprisingly, it has, in particular, been found that the above-specified objects are achieved by starting from colourless polyester granular material which, prior to its being fed to the screw of the injection moulding machine, is mixed with a solid particulate dyestuff composition which contains dyestuff and/or pigment and a solid wax-like carrier.

Attention is drawn to the fact that such dyestuff compositions are known per se from the Dutch Pat. Application No. 8000464 by the Applicant; the field of application specified is that such compositions may be used in the distribution and dosaging of dyestuffs in thermoplastic plastic-material mixes. These known dyestuff compositions are mainly used on a large scale in producing coloured products from polyvinyl chloride. Use of such particulate dyestuff compositions, the waxlike carrier of which has the nature of a lubricant, is not described for the production of work pieces from polyester by injection moulding. Surprisingly, it has been found that if such dyestuff compositions which contain products with a lubricant nature are used in polyester, such as, for example, polyethylene terephthalate, an extremely homogeneous and reproducible colouring can be achieved, while the mechanical properties are note affected, or are virtually not affected, the ability of the products with a lubricant nature to be leached out is minimal and the mechanical properties are virtually unchanged compared with a colourless material.

In respect to the invention reference is also made to U.S. Pat. No. 4 230 501 in which is described the colouring of polyester with a pigment composition resembling the dyestuff composition as used according to the present invention.

However, in said patent publication solely the forming of coloured samples by extrusion is described. Not described is an polyester article which is formed by injection moulding starting from colourless polyester material in granulate form to which a particulate dyestuff composition is fed during the injection moulding process.

In particular, the wax-like carrier has a melting point above 45° C. and is expediently chosen from an ester of an aromatic dicarboxylic acid and an alcohol, such as stearyl and cetyl phthalate, an ester of a polyhydric alcohol and an aliphatic carboxylic acid, such as an ester of pentaerythritol or glycerol and a fatty acid containing 12 to 18 carbon atoms, for example, pentaerythritol monostearate, pentaerythritol tetrastearate, glycerol mono-, di- or tristearate and mixtures thereof, montan wax, carnauba wax, hydrogenated oils, etc. For a review of carrier materials to be used according to the invention, reference is made to the paper by A. Riethmayer, Gummi-Asbest Kunststoffe, 1965, Volume 18, pages 425-432 entitled "Gleitmittel für PVC" ("Lubricants for PVC"). In the paper referred to, a summary is given of many of the carrier materials which can be used within the scope of the present invention and which can be converted, in the manner as specified in the previously mentioned Dutch Pat. Application No. 8000464, into dyestuff compositions for use in a coloured polyester container according to the present invention.

Advantageously, the wax-like carrier is formed by a hydrogenated oil, such as hydrogenated castor or ricinus oil.

In a preferred embodiment of the coloured container according to the present invention, this consists of amorphous polyethylene terephthalate, while an important application example of the coloured container according to the invention is a coloured bottle.

The invention also relates to a preform for a coloured polyester container which is characterized in that the coloured preform is produced by injection moulding colourless polyester granular material, with particles of a dyestuff composition consisting of an intimate mixture of a dyestuff and/or pigment and a wax-like carrier being fed in, the wax-like carrier having a melting point above 45° C. and consisting of a hydrogenated oil, such as a hydrogenated castor or ricinus oil.

The invention also relates to a method for producing a coloured polyester container by producing a coloured preform using injection moulding and then converting the preform to the desired final shape by blowing, which method is characterized in that a colourless polyester granular material which is mixed with separate particles of a dyestuff composition consisting of an intimate mixture of a dyestuff and/or pigment and a wax-like carrier is fed to an injection moulding installation.

In particular, the method according to the invention is characterized in that the polyester granular material is fed at elevated temperature and the dyestuff composition particles are fed to the stream of polyester material at a temperature which is below the melting point of the carrier. Preferably, the colourless polyester granular material is pretreated at a temperature of 150°–170° C. and is fed to the injection moulding machine essentially at the temperature used in that process. The pretreatment at elevated temperature may be necessary in order to dry the polyester granular material. The dyestuff composition is fed to the stream of polyester material at a temperature which is below the melting point of the wax-like carrier; to do this, use is advantageously made of a cooled feeder to prevent the high temperature of the polyester being communicated to the dyestuff composition particles, as a result of which it starts to melt or to clot.

The invention will now be explained by means of the following non-restrictive example.

EXAMPLE

Colourless polyethylene terephthalate granular material is dried at 170° C. for a minimum of 8 hours. To prevent the granular material attracting moisture again, it is introduced into the injection moulding machine at the same temperature. Into this stream of material, a small stream of particulate dyestuff composition is introduced by means of a cooled screw feeder. The particulate dyestuff composition consists of a green dyestuff (solvent green 3) and a carrier with a melting point of 85° C. (hydrogenated ricinus oil) in a ratio by weight of 1:1. In general, the quantity of dyestuff (or pigment) with respect to the total quantity of dyestuff composition may be 10–60% by weight. The dyestuff composition is, in this case, fed in a quantity of 0.1 part to 100 parts of colourless polyester granular material. Depending on the desired depth of colour, the quantity of dyestuff composition with respect to the total material quantity may be from 50 ppm to approximately 5% by weight; in particular, 0.1–2% by weight. In the injection moulding machine, the processing temperature of the polyethylene terephthalate is 300°–320° C.

From the preforms obtained in this manner, green-coloured polyethylene terephthalate bottles are produced which excel in colour homogeniety and which, as regards mechanical and chemical properties, are virtually completely equivalent to colourless polyethylene terephthalate bottles which have been manufactured from the same colourless granulate.

The presence of small quantities of wax-like carrier does not therefore reveal itself, or virtually does not reveal itself, in the properties of the material and can be detected only by a chemical analytical method.

In the present example the starting point for colouring the polyethylene terephthalate is a dyestuff which is soluble in the said material and in that case the coloured bottle obtained will be transparantly coloured. If a masking colouring is desired, the dyestuff will in general be used together with a pigment, a suitable pigment being, for example, titanium dioxide.

What is claimed is:

1. A method for producing a colored polyester container, comprising:

pretreating a colorless, granular polyethylene terephthalate material stream, the pretreatment comprising heating the polyethylene terephthalate stream to a temperature of 150° to 170° C.;

introducing a separate, particulate dyestuff composition stream to a cooled feeder, the dyestuff composition stream consisting of an intimate mixture of a dyestuff and/or pigment and a wax-like carrier, and cooling the feeder to thereby hold the dyestuff composition stream at a temperature below the melting point of the wax-like carrier and thereby preventing the high temperature of the polyethylene terephthalate stream from being communicated to the dyestuff composition stream until the dyestuff composition stream is mixed with the colorless, granular polyethylene terephthalate stream;

mixing the polyethylene terephthalate stream and the cooled dyestuff composition stream to form a mixed stream;

feeding the mixed stream to an injection molding apparatus;

injection molding a colored preform from the mixed stream; and blow molding the colored preform into a final shape.

* * * * *